United States Patent
Keser

[11] 3,901,487
[45] Aug. 26, 1975

[54] CONTINUOUSLY OPERABLE SCREW MACHINE

[75] Inventor: Fridolin Keser, Hemmingen, Germany

[73] Assignee: Werner & Pfleiderer, Stuttgart, Germany

[22] Filed: Nov. 19, 1974

[21] Appl. No.: 525,170

[30]   Foreign Application Priority Data
       Nov. 21, 1973   Germany............................ 2357945

[52] U.S. Cl.................................. 259/191; 259/191
[51] Int. Cl.² .......................................... B29B 1/06
[58] Field of Search ............ 259/191, 192, 193, 97,
       259/9, 10, 6, 7, 25, 26, 21, 22; 425/207, 208;
       100/145, 146; 198/213, 214, 215, 217; 415/73

[56]            References Cited
             UNITED STATES PATENTS
 3,280,425   10/1966   Beck................................... 259/191
 3,407,438   10/1968   Selbach............................... 259/192
 3,737,150    6/1973   Otake ................................. 259/191
 3,802,670    4/1974   Okada................................. 259/192

*Primary Examiner*—Robert W. Jenkins
*Attorney, Agent, or Firm*—Browdy and Neimark

[57]            ABSTRACT

A continuously operable, preferably single-shaft, schre machine for treating, for example, by kneading, mixing and/or homogenizing plastic materials, has a casing which encloses a worm shaft provided along its periphery with one or more worm threads, and an inlet aperture for the main bulk of the material and an additive feed aperture, disposed downstream in the conveying direction, for additives. Upstream of the inlet aperture, in the conveying direction, there is provided a back pressure device and at least one by-pass passage for the main material, the by-pass passage bypassing the back pressure device.

13 Claims, 4 Drawing Figures

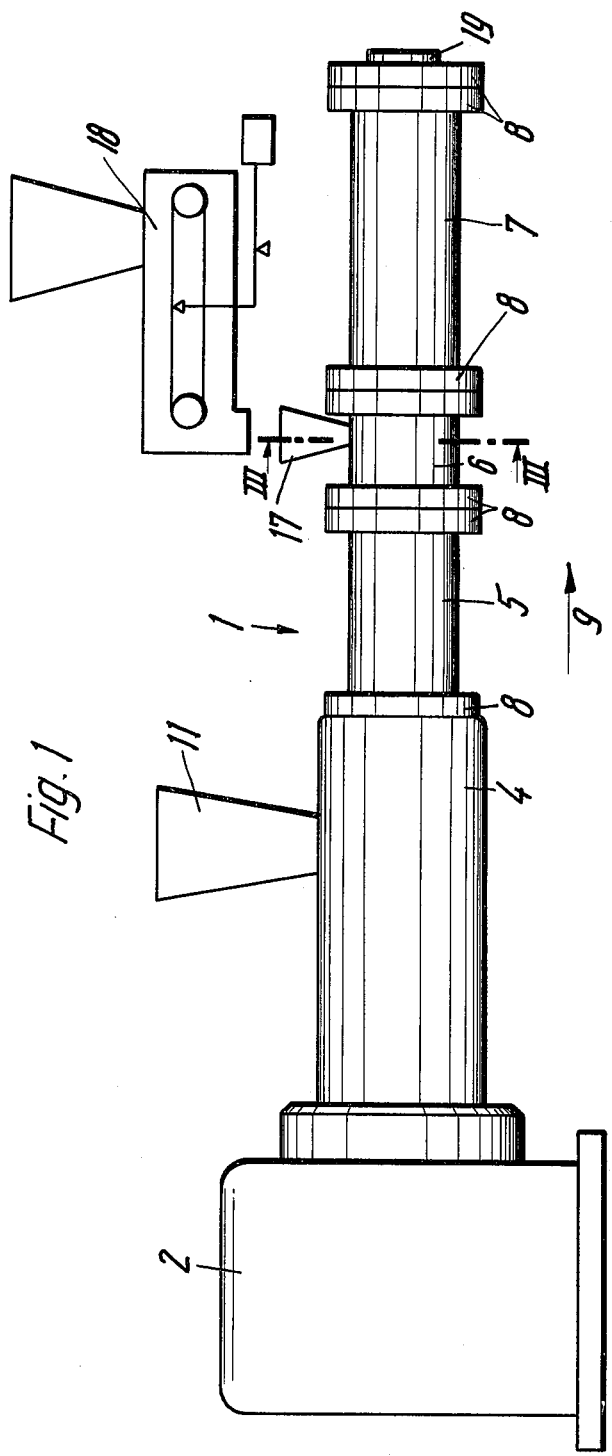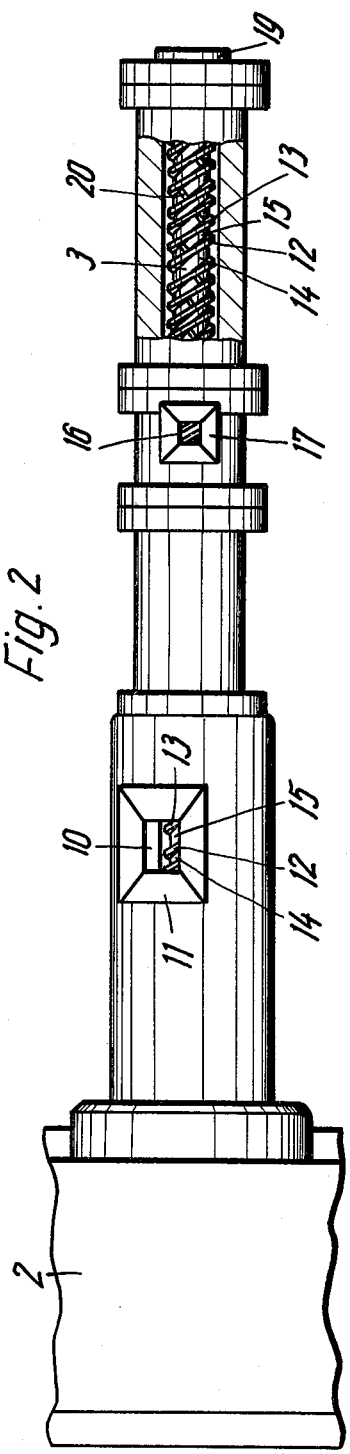

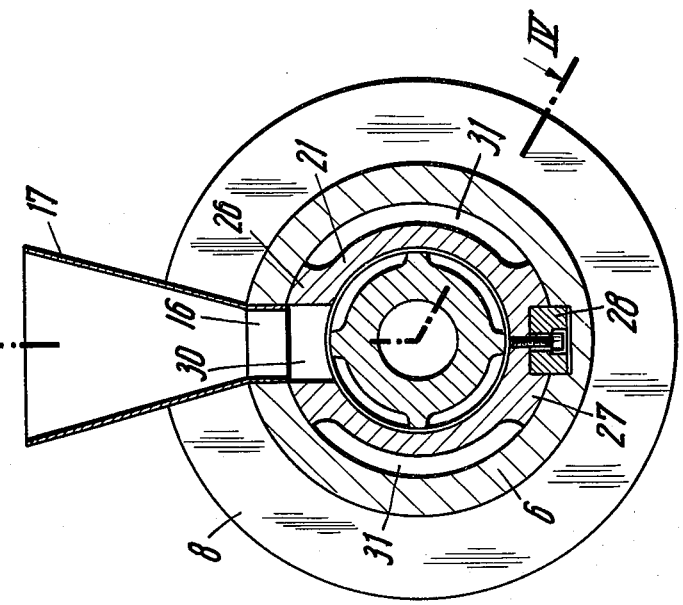
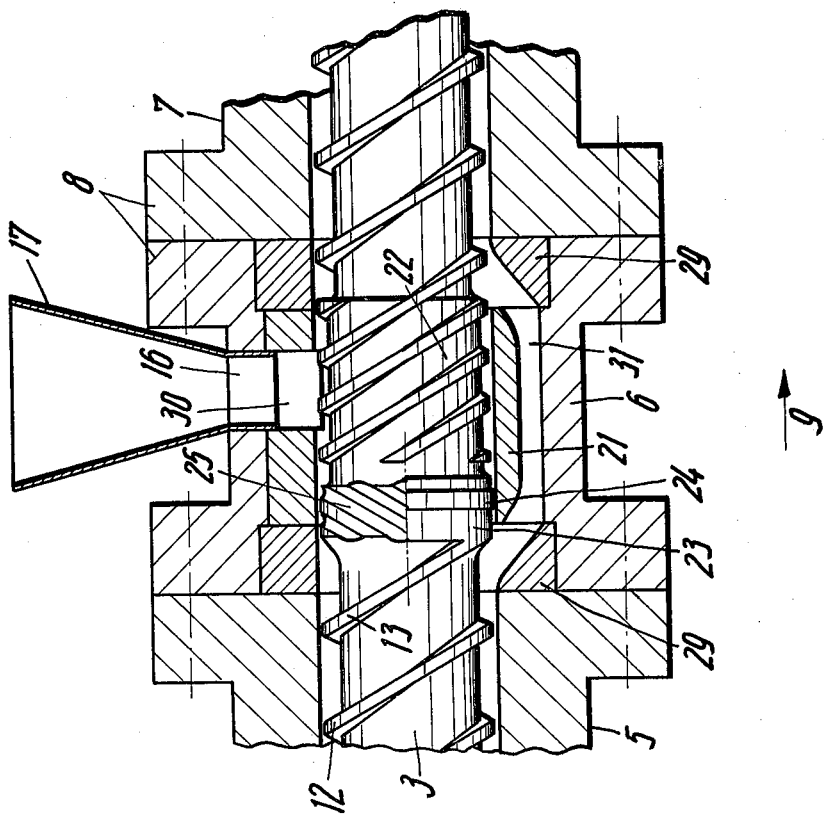

CONTINUOUSLY OPERABLE SCREW MACHINE

FIELD OF THE INVENTION

The invention relates to a continuously operable preferably single-shaft, screw machine for treating, for example, by kneading, mixing and/or homogenizing, plastic materials.

BACKGROUND OF THE INVENTION

DT-AS No. 1,803,896 discloses a screw machine in which the feed aperture for the additive, namely an expanding agent, lies exactly radially opposite the inlet of the by-pass passage. The additive is fed into the plasticised main naterial under a pressure applied from outside to the additive. The purpose of the back-pressure device and of the by-pass passage consists solely in preventing, during the mixing operation, a return flow of the additive from the mixing zone downstream of the back-pressure device into the conveying zone upstream of the back-pressure device. For this reason the by-pass pipe also has a relatively small diameter.

French Pat. No. 1,315,667 discloses a continuously operating single-shaft screw machine for treating plastic materials having a casing which encloses a worm shaft provided along its periphery with one or more worm threads and which has an inlet aperture for the main material and a supply aperture, disposed downstream in the conveying direction, for additives, wherein a throttle device for the main material is disposed upstream of the supply aperture for additives, referring to the conveying direction. This throttle device consists of a cylindrical shaft portion between which and the cylindrical casing only a narrow annular cylindrical gap is left, through which the plastic main material is pressed. The object of this throttle is to ensure that the main material melted in the portion of the worm preceding the throttle is thoroughly worked, and in addition the throttle serves to prevent the return flow of the main material, to which additives (e.g. color) have already been added, from the portion of the worm situated downstream of the throttle into the portion of the worm preceding the throttle.

In machines of this kind it is already known in practice for the additives to be supplied under pressure to the screw machine by means of worms or pistons.

This method of supplying the additives is largely dependent on the ability to flow or trickle (conveyability) and other physical properties of the additives, which may entail the disadvantages of unsteady supply or the compaction or conglomertion of the additives so that in turn the uniform mixing of these additives into the main material is impaired.

The construction of these feed devices must therefore always be adapted to the properties of the additives. In addition, these supply devices constitute an additional intermediate element in the flow of the additives supplied between a metering device or devices and the screw machine which is basically a disadvantage in a continuous process. Furthermore, additional energy is required for driving food devices of this kind.

It is an additional disadvantage that supply devices of this kind must be cleaned whenever the formulation of the additives is changed, and the additional time required for this purpose is particularly great when different dyes are used as additives. This cleaning time increases stoppage times and consequently involves a loss of production.

From DT-OS No. 1,800,226 and also from U.S. Pat. No. 2,576,444 it is known to plasticize the main material in a separate screw machine, and to extrude from the latter a tube into which the additives are introduced from a separate driven feed device, whereupon further plasticizing and mixing of the main material and additives is effected in another screw machine. The expense of the machines is extremely great in this case. In addition, the necessary weight ratio of main material, for example rubber, to the additive or additives can be achieved only through relatively great expenditure for measuring and control devices. The adjustment and operation of such machines requires operating personnel having high technical qualifications. Furthermore, the expenditure for energy is relatively great in this case.

DT-AS No. 1,529,811 discloses a continuously operating preferably single-shaft screw machine for treating plastic materials, having a casing which enclose a worm shaft provided along its periphery with one or more worm threads and which has an inlet aperture for the main material wherein a back-pressure device is provided which is formed by an oppositely directed portion of worm thread and which is by-passed by a by-pass channel. This by-pass channel serves solely to guide the main material through a vacuum degassing device. As an alternative, a cylindrical shaft portion may be provided for this purpose as a back-pressure device.

In this known screw machine the by-pass channel leads radially into the worm casing downstream of the back-pressure device, referring to the conveying direction, while a truncated segmental portion of the casing wall adjoins the roughly tubular supply aperture which enters radially, the said portion extending over less than half the periphery of the worm and serving to ensure better axial admission of the main material into the worm.

SUMMARY OF THE INVENTION

The problem underlying the present invention consists in so developing a screw machine of the kind first described above that one or more additives are fed to the screw machine without pressure, that it to say without the interposition of a separate feed device.

According to the invention there is provided a continuously operable screw machine for treating plastic materials, the machine having a casing which encloses a worm shaft provided along its periphery with one or more worm threads, which casing has an inlet aperture for the main bulk of the material to be treated and an additive feed aperture, disposed downstream of the inlet aperture in the conveying direction, a back pressure device being disposed upstream of the feed aperture, in the conveying direction and at least one by-pass channel for the said main bulk, by-passing the back-pressure device, the by-pass channel or channels extending to a point downstream of the additive feed aperture.

The invention therefore takes as its starting point the basic principle of removing the already plasticized main material from the worm shaft upstream of the feed aperture for the additives, and returning it to the worm shaft only downstream of the feed aperture, while shortly before that moment the additive or additives have already been supplied to the worm shaft, so that thorough mixing occurs as soon as the main material and the additives are brought together. No separate feed devices for producing the required feed pressure are now necessary. This makes it possible at the same time for highly sensitive metering devices, such as for example belt weighing machines, for solid but flowable substances, e.g. particulate materials, to be disposed upstream of the feed aperture, so that a highly constant weight ratio of main material to additives is achieved. The necessary feed pressure is received by the additives through the worm shaft of the screw machine. The additives are fed to the latter without pressure, for example in free fall. A feed aperture may for example also be preceded by a plurality of different metering devices for different additives.

The back-pressure device is expediently formed by a length of worm thread of the opposite hand to the remainder of the worm thread and/or a cylindrical shaft portion with a peripherical seal.

In order to bring the additives and the main material together in the most intensive manner possible, it is particularly advantageous to the by-pass channel or channels to extend, at least at its end, over a large part, e.g. at least half, of the periphery of the worm shaft.

A solution which is particularly simple from the constructional point of view is achieved if in accordance with a preferred embodiment of the invention the by-pass channel or channels are disposed between a displacement body, which surrounds the worm shaft over the length of the by-pass channels, and the inner wall of the casing.

This displacement body is secured axially, tangentially, and radially in the casing. For the radial fastening of the displacement body in the casing it is advantageous to utilize at least two spacers which are disposed on the periphery of the displacement body and spaced axially apart and which bear against the inner wall of the casing, while in a particularly simple embodiment of the invention the spacers comprise a top and a bottom web extending in the longitudinal direction of the casing. In this case a feed hole aligned with the feed aperture is provided in the top wheb of the displacement body, thereby ensuring at the same time that the feed aperture is not in communication with the by-pass passages. In this arrangement the tangential fastening of the displacement body is particularly simple if a guide wedge is provided between the bottom web and the inner wall of the casing.

The webs are as narrow as possible, while in addition it is advantageous for them to taper at their ends, since in this way minimum resistance is offered to the flow of the main material into and out of the by-pass channels.

In the region of the feed aperture the worm shaft may be subjected to temperature control in a conventional manner. Furthermore, a dustproof cover may be provided in the region upstream of the feed aperture for the additive or additives.

Finally, it is also advantageous for the portion of the worm shaft associated with the displacement body to be provided with a plurality of screwthreads, in order to produce the necessary feed pressure for the additives over the shortest possible path.

BRIEF DESCRIPTION OF THE DRAWING

A preferred embodiment of the invention will now be described by way of example with reference to the drawing, in which:

FIG. 1 shows a screw machine with an associated metering device for additives, in side elevation.

FIG. 2 is a plan view, partly broken away, of the screw machine shown in FIG. 1.

FIG. 3 is a section through the screw machine of FIGS. 1 and 2 in the additive feed plane taken of the sectional line III—III in FIG. 1 and on a larger scale, and, FIG. 4 is a partial longitudinal section through the screw machine taken on the sectional line IV—IV in FIG. 3.

DETAILED DESCRIPTION OF THE DRAWING

The screw machine (extruder) shown in the drawing consists essentially of a substantially cylindrical casing 1 and a worm shaft 3 which is disposed coaxially therein and is adapted to be driven by a drive motor 2. This is a single-shaft machine. The casing 1 consists of a plurality of casing sections 4, 5, 6, 7 which are disposed coaxially one behind the other and which are joined together through peripheral flanges 8.

In the first casing section 4, in the conveying direction 9 is provided an inlet aperture 10, on which an inlet hopper 11 is mounted for feeding the main bulk of material which is to be treated, such as for example vulcanized or unvulcanized rubber, extrudable plastics materials, or the like.

On the outer periphery the worm shaft 3 is provided with one or more worm threads 12, 13, between which a corresponding number of worm thread grooves 14, 15 are formed. The inside diameter of the first casing section 4 is considerably larger than the maximum diameter of the corresponding worm threads 12, 13 so that in this region of the casing 1 the main material introduced through the inlet aperture 10 is simply drawn in.

The inside diamter of the following casing section 5 is only slightly larger than the outside diameter of the worm threads 12, 13, so that in the region of the screw machine intensive treatment of the main material is effected in a conventional manner.

In the next casing section 6 a second feed aperture 16 is provided on which a feed hopper 17 is mounted and through which additives, such as for example vulcanization materials, coming from a metering device 18 for example a belt weighing machine can be introduced. The construction of this casing section is explained in greater detail further on. In the next casing section 7, which is the last, the main material, together with the additive or additives, is subjected to an intensive mixing process and is then extruded through an extruder head 19. Particularly in the mixing zone situated in the casing section 7, so called cross-webs 20 may be provided between two neighboring worm threads 12 and 13, by means of which webs the main material and the additives are pressed under heavy shearing stress. A construction of a worm shaft of this type is fully described in U.S. Pat. No. 3,687,423.

In the casing section 6 forming the addition zone a displcement body 21 is disposed which, internally, is of cylindrical form in the axial direction and which encloses with slight clearance the appertaining worm shaft portion 22.

At the beginning of the displacement body, in relation to the conveying direction 9, the appertaining worm shaft portion 22 is provided with a back-pressure device. As shown for the bottom half of the worm shaft shown in FIG. 4, this backpressure device may consist of a cylindrical portion 23 having a diameter only slightly smaller than the inside diameter of the displacement body 21, this cylindrical portion 23 being provided with a groove which extends around it and in which is inserted a sealing ring 24 lying firmly against the inner wall of the displacement body 23. As an alternative, this back-pressure device may also be formed by a plurality of worm thread portions 25 extending oppositely to the worm threads 12 and 13, which deliver in the conveying direction 9, that is to say delivering backwards. These worm thread portions 25 are relatively close to one another, that is to say a multi-thread construction is provided here. This construction is illustrated in the upper half of FIG. 4.

Worm thread portions of this kind extending in the opposite direction, may obviously also be provided for safety reasons upstream of a cylindrical portion provided with a sealing ring.

At top and bottom the displacement body 21 is fastened radially in the casing section 6 by means of corresponding webs 26 and 27 respectively. The displacement body 21 is fastened tangentially by a guide wedge 28 engaging on the one hand in the casing section 6 and on the other hand in the bottom web 27. Finally, the displacement body 21 is fastened in the axial direction by spacer rings 29, which in turn bear by their free end faces against the peripheral flanges 8 of the neighboring casing sections 5 and 7 respectively.

In the upper web 26 of the displacement body a feed-hole 30 in line with the feed aperture 16 is provided.

In its lateral outer longitudinal regions, that is to say externally between the webs 26 and 27, the outside diameter of the displacement body 21 is markedly smaller than the inside diameter of the casing portion 6, so that in this region two by-pass passages 31 are formed between the displacement body 21 and the inner well of the casing portion 6. The outer wall of the displacement body 21 is tapered at its ends in the region of these by-pass passages 31, while at the same time the spacer rings 29 are bevelled, so that the by-pass channels 31 can extend on the outside past the displacement body 21 with the greatest possible freedom from sharp bends, as shown clearly in the bottom half of FIG. 4. The worm shaft portion 22 inside the displacement body 21 has a plurality of threads - for example four threads in the case of FIG. 3, so that the additives introduced through the feed aperture 16 and the feed-hole 30 can already be added with the necessary pressure to the main material which comes from the casing portion 5 and which passes laterally and externally past the displacement body through the by-pass channels 31 and is returned to the worm shaft at the end of the displacement body.

The back-pressure device at the beginning of the displacement body 21 ensures that all the incoming main material is forced through the by-pass channels 31. The webs 26 and 27 are kept as narrow as possible, in order to ensure good distribution of the additives and main material as soon as they are brought together at the mouth of the by-pass channels. In addition, it is expedient for the webs to be tapered at their ends in order to assist the flow.

It will be obvious to those skilled in the art that various changes may be made without departing from the scope of the invention and the invention is not to be considered limited to what is shown in the drawings and described in the specification.

What is claimed is:

1. A continuously operable screw machine for treating plastic materials, the machine having a casing which encloses a worm shaft provided along its periphery with one or more worm threads which casing has an inlet aperture for the main bulk of the material to be treated and an additive feed aperture, disposed downstream of the inlet aperture in the conveying direction, a back-pressure device being disposed upstream of the feed aperture, in the conveying direction and at least one by-pass channel for the said main bulk, by-passing the back pressure device, said at least one by-pass channel extending to a point downstream of the additive feed aperture.

2. A machine as claimed in claim 1 wherein the back-pressure device is formed by a worm thread portion oppositely handed with respect to the remainder of the worm threads on said shaft.

3. A machine as claimed in claim 1 wherein the back-pressure device is formed by a cylindrical shaft portion having a peripheral seal.

4. A machine as claimed in claim 1 wherein said at least one by-pass channel extends, at least at its ends over more than half of the periphery of said worm shaft.

5. A machine as claimed in claim 1, wherein said at least one by-pass channel is disposed between a displacement body, which surrounds said worm shaft over the length of said at least one by-pass channel, and the inner wall of said casing.

6. A machine as claimed in claim 5 wherein the displacement body is fastened axially, tangentially, and radially in the casing.

7. A machine as claimed in claim 6 wherein for the radial fastening of the displacement body in the casing at least two spacers are provided, which spacers are disposed on the outer periphery of the displacement body and are angularly spaced apart, and which bear against the inner wall of the casing.

8. A machine as claimed in claim 7 wherein the spacers comprise an upper and a lower web extending in the longitudinal axial direction of the casing.

9. A machine as claimed in claim 8 wherein a feed hole aligned with the feed aperture is provided in the upper web of the displacement body.

10. A machine as claimed in claim 9 wherein the webs are tapered at their ends.

11. A machine as claimed in claim 8 wherein the webs are tapered at their ends.

12. A machine as claimed in claim 11 wherein a guide wedge is provided between the upper web and the inner wall of the casing.

13. A machine as claimed in claim 1 wherein the portion of said worm shaft by-passed by said at least one by-pass channel has a plurality of threads.

* * * * *